(12) United States Patent
Vu (10) Patent No.: US 7,161,901 B2
(45) Date of Patent: Jan. 9, 2007

(54) AUTOMATIC LOAD BALANCING IN SWITCH FABRICS

(75) Inventor: Chuong D. Vu, Simi Valley, CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 999 days.

(21) Appl. No.: 10/020,491

(22) Filed: Dec. 11, 2001

(65) Prior Publication Data

US 2002/0186656 A1  Dec. 12, 2002

Related U.S. Application Data

(60) Provisional application No. 60/289,557, filed on May 7, 2001.

(51) Int. Cl.
 H04L 12/56 (2006.01)
 H04Q 11/04 (2006.01)
(52) U.S. Cl. .................. 370/229; 370/386
(58) Field of Classification Search ............ 370/229, 370/230, 412, 413, 415, 386
 See application file for complete search history.

(56) References Cited

U.S. PATENT DOCUMENTS

| 5,355,372 | A | 10/1994 | Sengupta et al. |
| 5,367,520 | A | 11/1994 | Cordell |
| 6,871,347 | B1 * | 3/2005 | Hay .................. 718/105 |
| 2002/0141427 | A1 * | 10/2002 | McAlpine .......... 370/413 |

OTHER PUBLICATIONS

Fan, et al., "Expandable ATOM Switch Archietecture (XATOM) for ATM LANs", Supercomm/ICC., New Orleans, International Conference on Communications (ICC), New York, IEEE, U.S., vol. 1, May 1, 1994 (p. 402-409).
Kumar, et al. "Performance Enhancement In Buffered Delta Networks Using Crossbar Switches And Multiple Links", Journal of Parallel And Distributed Computing, Academic Press, Duluth, MN, US, vol. 1, No. 1, Aug. 1984 (p. 81-103).
Chowdhury, et al., "Design And Performance Of A Threshold-Based Load Balancing Scheme In An ATM Switch", Computer Networks and ISDN Systems, North Holland Publishing, Amsterdam, NL, vol. 29, No. 2, 1997 (p. 157-164).
European Search Report for European Application No. 02090163.3, filed May 3, 2002, Search Report completed Nov. 24, 2003 and mailed Dec. 16, 2003 (5 pages total).
Wikander, "A Multi-Chip Architecture for High-Capacity Packet Switching", Master Thesis, Luleå University of Technology, Dec. 30, 1999 (pp. 1-61).
Buhrgard, et al., "A scaleable ATM switching solution", Ericsson Review, No. 1, 1998 (pp. 24-31).

(Continued)

*Primary Examiner*—Derrick Ferris
(74) *Attorney, Agent, or Firm*—Christie, Parker & Hale, LLP (57) ABSTRACT

A load balancing system and method for network nodes is provided. The load balancing system includes crossbar devices, queues to receive data and a load balancer. The load balancer determines the amount of data in each of the queues and sends data to specific crossbar devices based on the amount of data in each queue. The queues include a high priority queue and a number of non-high priority queues.

47 Claims, 6 Drawing Sheets

OTHER PUBLICATIONS

Piekarski, "Reinventing the Switch Fabric Architecture", URL: http://www.commsdesign.com/story/OEG20010521S0113, Communications Systems Design, Jun. 1, 2001 (6 pgs).

IBM Microelectronics, "The Network Processor Enabling Technology for High-Performance Networking", Network Processor, 1999, (5 pgs) http://www.chips.ibm.com.

* cited by examiner

AUTOMATIC LOAD BALANCING IN SWITCH FABRICS

CROSS-REFERENCE TO RELATED APPLICATIONS

This application claims the benefit of U.S. Provisional Application No. 60/289,557 filed May 7, 2001 which is hereby incorporated by reference as if set forth in full herein.

BACKGROUND

The present invention relates generally to switching devices, and more particularly to load balancing a switch system with multiple switching elements, including those in which switching elements are dynamically added or removed.

Conventionally, network communication systems include multiple communication or network nodes interconnected together to provide high speed communication throughout the systems. These communication systems have become widely pervasive and are rapidly growing. However, with this growth, the demand to provide information faster without any undue delay is also growing. Likewise, the demand to provide larger amounts of information is increasing. As such, communication nodes or devices are expected to operate quicker in order to provide information faster and/or accommodate large amounts of information, i.e., support an increased bandwidth. However, at times, providing information faster and support a large bandwidth are competing demands.

Also, in order to meet these demands the ability for communication devices to be upgraded, adapted or replaced becomes a concern. Often times, communication devices are re-configured or replaced and thereby causing down-time, i.e., making a particular network inoperable for a period of time. Furthermore, the cost of upgrading and maintaining communication devices that are larger and faster may be cost prohibitive. In addition, communication devices that are under utilized become a waste of resources and in some cases may obviate the need to expand or replace a communication device to provide a particular bandwidth and/or speed.

However, in providing more information faster communication devices are also expected to maintain a particular quality of service and reliability. In other words, not only does information need to be sent and received, but the information should be sent within a specific time frame with minimal errors.

SUMMARY OF THE INVENTION

The present invention provides a load balancing method and system for a switch system with multiple switching elements or network nodes. In one embodiment, the load balancing system includes a plurality of crossbar devices and a plurality of queues. The plurality of queues are configured to receive data. The system also includes a load balancer coupled to the plurality of queues and configured to determine an amount of data in each of the plurality of queues and to send the data to specific ones of the plurality of crossbar devices based on the amount of data in each queue. In one aspect of the invention, the plurality of queues includes a high priority queue and a plurality of non-high priority queues. Also, in another aspect of the invention, the load balancer sends the data to specific crossbar devices of the plurality of crossbar devices based on the amount of data in the high priority queue relative to the amount of data in each of the plurality of non-high priority queues. Furthermore, in a further aspect of the invention, the load balancer is configured to detect inoperable crossbar devices and to detect additional crossbar devices added to the plurality of crossbar devices.

In another embodiment, a load balancing method is provided in which a plurality of data is received and stored in a plurality of queues. Each data of the plurality of data is placed in a specific queue of the plurality of queues based on a priority associated with each data. The occupancy levels in each of the plurality of queues is determined and the data is transmitted to a plurality of crossbar devices based on the determined occupancy levels in each queue.

In a further embodiment, a load balancing system is provided that includes a switching element means. The load balancing system also includes a first holding means for receiving and storing high priority data and a second holding means for receiving and storing non-high priority data. The load balancing system further includes a balancing means for determining an occupancy level of the first and second storing means and sending data to specific switching element means based on the determined occupancy level of the first storing means in relation to the determined occupancy level of the second storing means.

Many of the attendant features of this invention will be more readily appreciated as the same becomes better understood by reference to the following detailed description and considered in conjunction with the accompanying drawings.

DETAILED DESCRIPTION

Crossbar devices are specialized communication devices that provide communication paths from multiple inputs to multiple outputs. Each communication path has a predefined capacity that represents the maximum amount of information or data that can be accommodated or supported by the communication path. Crossbar devices are often found in network devices or nodes, such as switches or routers, that receive information and reconfigure a communication path in order to send the received information to a recipient designated by the received information. The present invention, generally, allows for maximum utilization of the crossbar devices and the addition of crossbar devices without user intervention and down-time.

Figure 1:
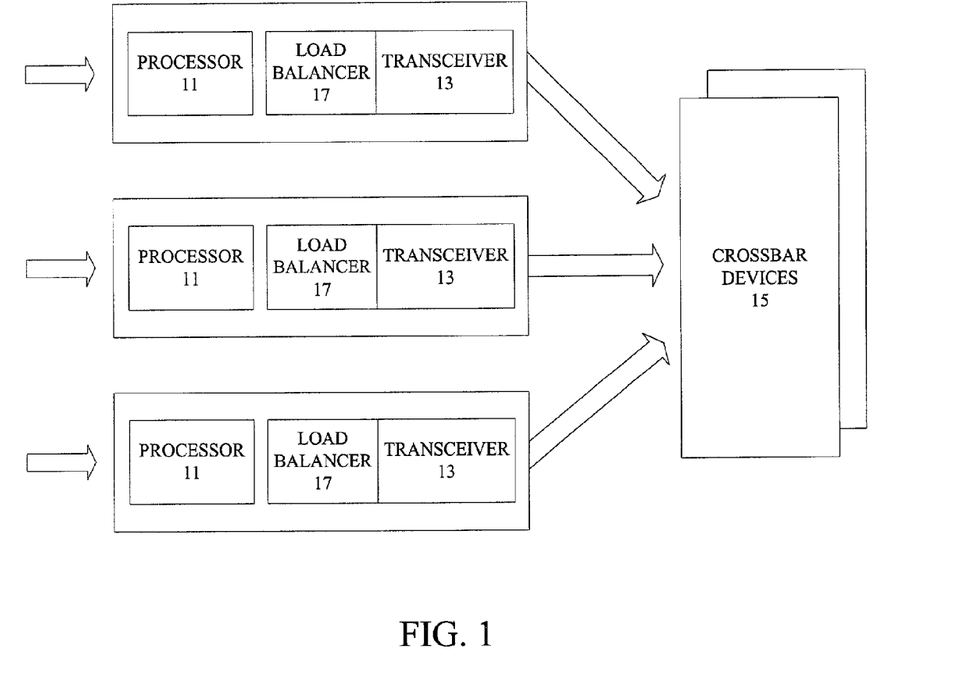
FIG. 1 illustrates one embodiment of the load balancing system of the present invention.

FIG. 1 shows one embodiment of a switch configuration of the present invention. Multiple data streams are routed through a node. The node includes network and/or packet processors 11 and, in some embodiments, various other specialized processors or circuitry for performing various processes associated with transmission, reception, and routing of, for example, ATM or SONET traffic. The processors process data incoming to and outgoing from the node. In one embodiment, the processors perform network traffic management functions. Within the node, the processors provide data to and receive data from transceivers, with the data being provided to the transceivers 13, for example, over a common switch interface (CSIX)-L1 compliant link.

The transceivers are coupled to multiple crossbar devices 15 in parallel. In one embodiment, each of the transceivers include a plurality, such as four, i/o ports available for coupling to the crossbars. The crossbars route data from one transceiver to another. The use of multiple crossbar devices allows for increased data throughput, as well as for redundancy in the event of failure of a crossbar device.

In operation, the switch in one embodiment is under centralized control of a processor. The processor receives routing requests and priority requests from transceivers, allocates crossbars, and provides configuration commands to the crossbars. In other embodiments, the transceivers perform distributed control of the switch.

The crossbars and the transceivers may have different clock domains. In such a configuration various alignment methods may be used, for example such as those described in U.S. Pat. Application HIGH SPEED CROSS POINT SWITCH ROUTING CIRCUIT WITH WORD-SYNCHRONOUS SERIAL BACK PLANE, application Ser. No. 09/129,662; Filed Aug. 5, 1998, the disclosure of which is incorporated in its entirety herein.

The switch includes an automatic load balancing function. In one embodiment, a load balancer 17 performs the load balancing function. This load balancer can be used with 1 to N crossbar switch fabric devices. The load balancer determines which crossbar devices are active and evenly distributes the data traffic across these devices. This allows easy fabric bandwidth upgrades by simply adding more crossbar devices. In addition, redundant crossbar devices that are normally left unused, can add extra fabric bandwidth during normal operation.

The load balancer is also configured to automatically stop sending data to a failed crossbar device. In one embodiment the transceivers determine whether a crossbar device is operational by monitoring responses to an initialization command sent to the crossbar via one of the i/o ports. If the crossbar responds to the initialization command and is able to perform alignment functions, if necessary, the crossbar is available for use. If the crossbar is available for use, the crossbar is allocated for data transmission by the load balancer. If the crossbar is not available for use, the crossbar is not allocated for data transmission by the load balancer.

The transceiver is able to determine when a crossbar is no longer available through a variety of mechanisms, such as periodic status messages provided by the crossbar. In one embodiment, however, the crossbars receive as part of the data transmissions periodic word or frame alignment information. The crossbars perform, for example, frame alignment using the alignment information, and generate an out of frame signal (OOF) (or more often a not OOF signal). When the transceivers receive an indication that a crossbar is not in alignment, the crossbar is treated as unavailable by the load balancer. In other embodiments, framing, for example, is performed by receiving transcievers, and the receiving transceivers provide indications of lack of alignment, as well as an indication of which crossbar is providing the out of alignment data.

Thus, to upgrade the fabric bandwidth by adding more crossbar devices, the system need not be reconfigured through software control. Multiple crossbar devices are also used for redundancy. Moreover, redundant crossbars may be used during normal system operation as load balancing results in the use of the remaining active crossbars.

Figure 2A:
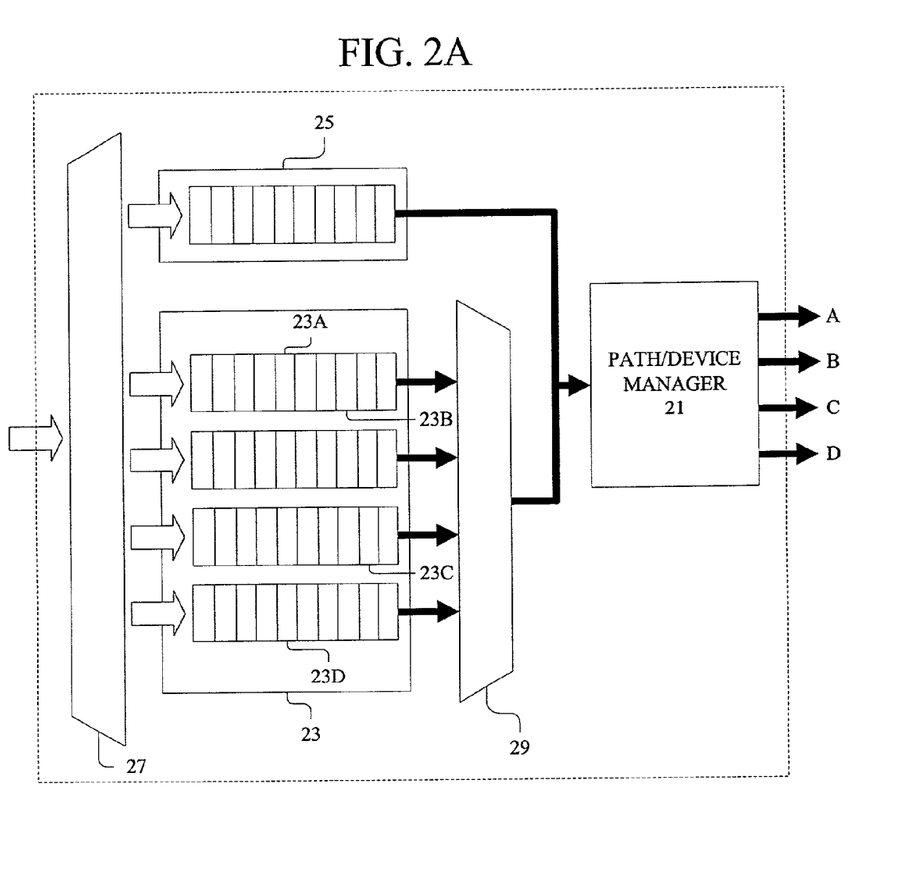
FIG. 2A illustrates one embodiment of the load balancer of the present invention.

In one embodiment, the load balancing function works as follows. Ingress queues shown in FIG. 2A can have from 0 to N frames ready for transmission to multiple crossbar devices, in this case four, coupled to links A, B, C or D. In the example of FIG. 2A, the ingress queues receives frames from a de-multiplexer 27 which receives a data stream. The queues and the links A, B, C, and D are associated with a path/device manager 29. As illustrated, the ingress queues include a high priority (HP) queue 25 and four non-HP queues 23a–d. In one embodiment, the frames from the non-high priority queues are provided to the path/device manager via a multiplexer 29. A low (L), medium (M) or high (H) threshold mark or capacity indicator is established for each queue. The occupancy level or the amount of information, e.g., the number of frames, in each queue determines the order in which data is to be transmitted across the four crossbar devices as shown, for example, in Table 1.

TABLE 1

| High Priority Queue's Occupancy Level | Non-High Priority Queues' Occupancy Level | Links for the High Priority Queue | Links for the Non-High Priority Queue |
|---|---|---|---|
| High | Any* | A, B, C, D | — |
| Medium | High | A | B, C, D |
| Medium | Medium | A, B | C, D |
| Medium | Low | A, B, C, | D |
| Medium | Empty | A, B, C, D | — |
| Low | High | — | A, B, C, D |
| Low | Medium | A | B, C, D |
| Low | Low | A, B | C, D |
| Low | Empty | A, B, C, D | — |
| Empty | Any* | — | A, B, C, D |

*"Any" being high, medium, low or empty

Examination of a simple case when only one queue has data is instructive. If the queue holds four or more frames, crossbar connections are requested from all four crossbar devices. If the queue only holds three frames, connections are requested from only three crossbar devices etc. If there are less then 4 frames in the queue, the crossbar devices are selected using a round robin method.

In most cases, more then one queue will hold data frames. Queues, in various embodiments, have different priorities and different threshold marks allowing the user to tailor the bandwidth from each queue as shown in the table above.

If one of the crossbar devices has failed or is pulled from the system, the load balancer can detect this out of frame condition through the links labeled A, B, C and D. If one of these devices coupled to these links is out of frame, the load balancer will no longer send connection requests or data to this crossbar device. This mechanism is automatic and requires no user or software intervention.

Thus, the switch fabric can be easily upgraded by adding more crossbar devices in parallel, avoiding system downtime. In addition, the switch fabric does not need to identify or dedicate crossbar devices for redundancy. All crossbar devices in the fabric can be actively used.

Figure 2B:
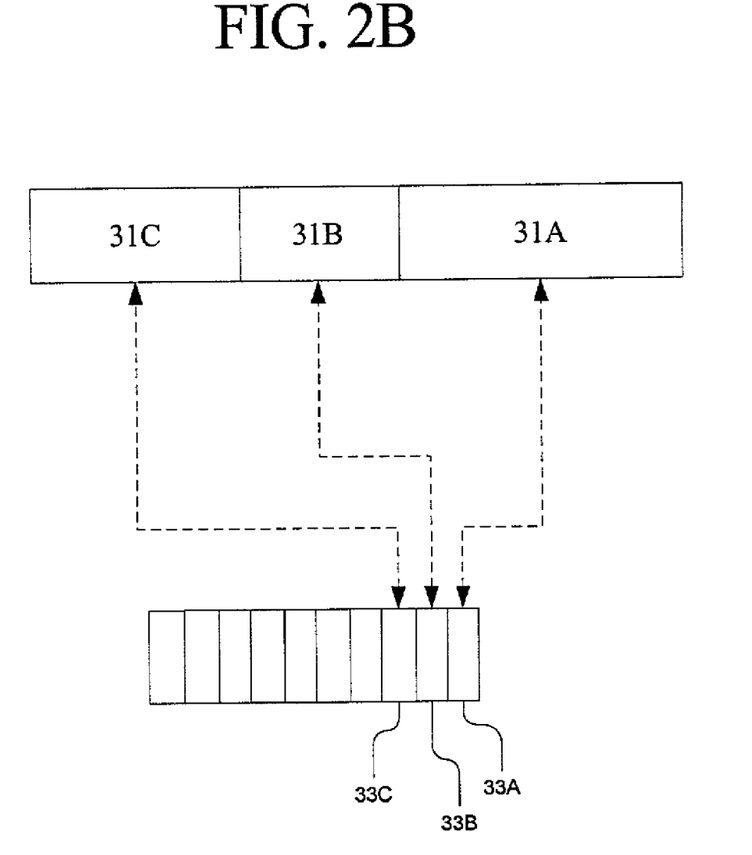
FIG. 2B illustrates one embodiment of a queue.

FIG. 2B illustrates one embodiment of a queue of the present invention. The queue is divided into portions, in this case, a first portion 31a, a second portion 31b and a third portion 31c. When data is first received it is placed in the first portion of the queue. Once the first portion of the queue is completely filled the received data is placed in the second portion of the queue. Likewise, when the second portion of the queue is completely filled with data, the received data is placed in the third portion of the queue. In other words, data will be placed in a succeeding portion of the queue once the previous portion of the queue is filled. In one embodiment, corresponding portion indicators 33a, b, c, are associated with the first portion, the second portion, and the third portion, respectively. The portion indicators indicate that data is in one of the three portions.

In one embodiment, the portion indicators are bits in a portion register. In this embodiment, if, for example, the second portion indicator 33b is high or set to a logic level one, this indicates that data is in the second portion of the queue. The portion register, in one embodiment, includes numerous portion indicators that corresponds to numerous portions for each of the queues. By using the portion indicators for determining the occupancy level or the amount of data or information in each queue, the order in which data is transmitted to the cross-bar devices is determined. Similar to the determination shown in Table 1, the information may be transmitted from a queue to a particular device via a link by using the first portion indicator for the low capacity indicator, the second portion indicator for the medium capacity indicator and the high capacity indicator for the third portion indicator.

In various embodiments, the queue is also divided into more than three portions or less than three portions and/or has corresponding portion indicators associated with each portion of the queue. Also, the size of each portion, e.g., the amount of frames capable of being in each portion, may vary and may be modified and/or configured by a user or the load balancer. Furthermore, the boundaries of the portions are set, determined and/or modified by a user or the load balancer, for example, by adjusting the association of the portion indicators to the corresponding portion.

Figure 3:
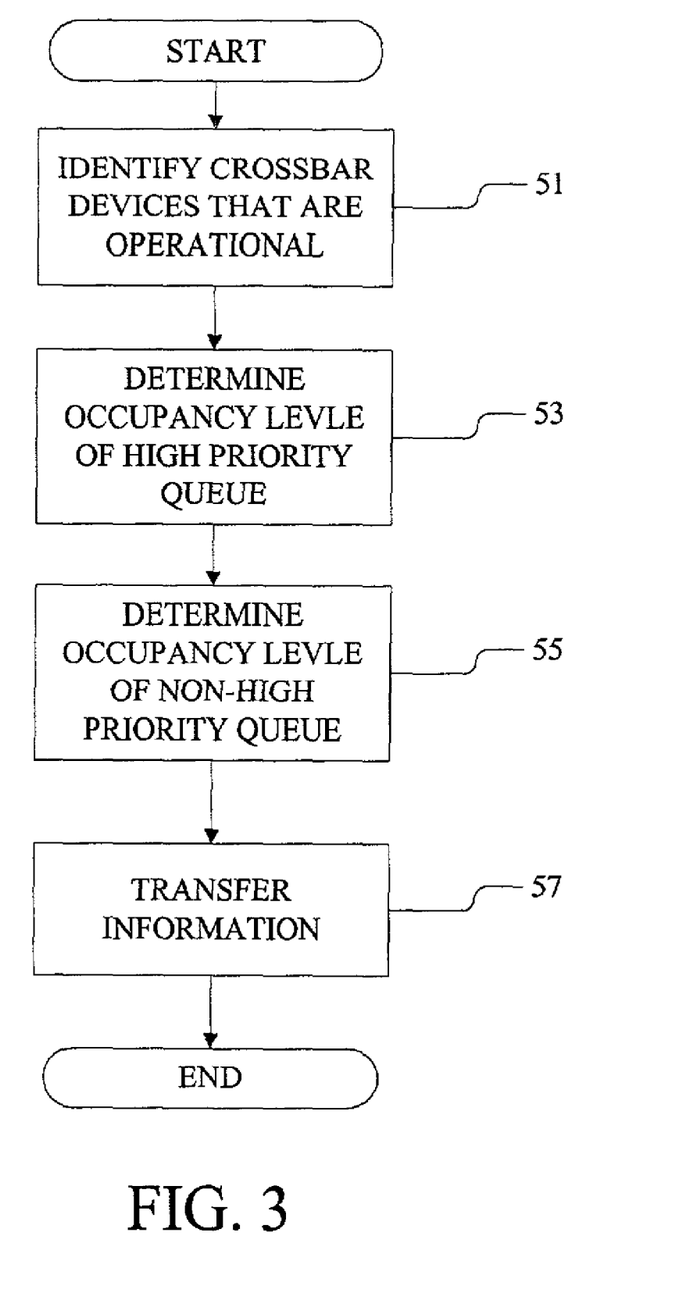
FIG. 3 illustrates an overview of the load balancing process of the present invention.

In FIG. 3, an overview of the load balancing function is illustrated. In block 51, the process determines which crossbar devices are operational. In block 53, the process determines the occupancy level of the high priority queue. In block 55, the process determines the occupancy level of the non-high priority queue. In block 57, the process arranges for the transfer of information from the high priority queues and the non-high priority queues to the operational crossbar devices based on the occupancy levels of the queues and then the process ends.

Figure 4:
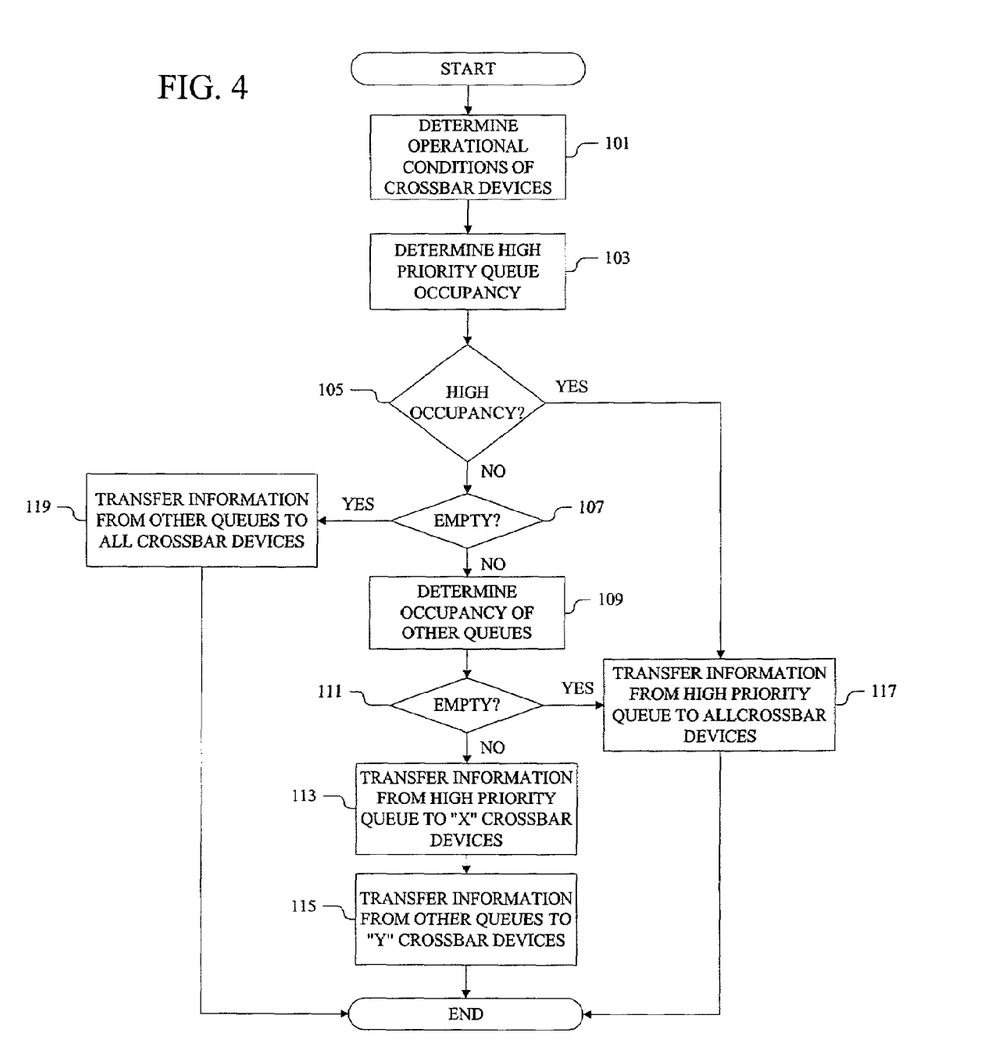
FIG. 4 illustrates one embodiment of the load balancing process of the present invention.

In FIG. 4, one embodiment of the load balancing function is illustrated. In block 101, the process determines the operational conditions of the crossbar devices. The number of crossbar devices that are operational is recorded. For example, the total number of crossbar devices may be five and the number of operational crossbar devices may be three, e.g., crossbar devices 1, 2 and 3. In block 103, the process determines the occupancy level of the high priority queue. In one embodiment, the process reads an indicator register of the high priority queue to determine the occupancy level of the queue, e.g., high, medium, low or empty. In block 105, the process determines if the occupancy level of the high priority queue is high. If the process determines that the occupancy level of the high priority queue is high, the process in block 117 assigns or arranges that the information in the high priority queue is transferred to all the operational crossbar devices determined in block 101.

If the process determines that the occupancy level of the high priority queue is not high, the process in block 107, determines if the occupancy level of the high priority queue is empty. In one embodiment, the process determines that the occupancy level is not high, medium or low to determine that the queue is empty. If the process determines that the high priority queue is empty, the process arranges that the information in the non-high priority queues are transferred to all the operational crossbar devices in block 119 and the process ends.

If the process determines that the high priority queue is empty, the process in block 109 determines the occupancy level of the other non-high priority queues. In one embodiment, the process accesses/reads an indicator register of the high priority queue to determine the occupancy level of the queue, e.g., high, medium, low or empty. In block 111, the process determines if the other queues are empty. If the process determines that the other queues are empty, the process arranges to transfer information from the high priority queue to all the operational crossbar devices, in block 117, and the process ends. In one embodiment, the process does not end, but continues, repeating over again at block 101 until commanded externally to end, such as by a shutdown command provided by a user or a control hardware/software.

If the process, in block 111, determines that the other queues are not empty, the process in block 113 arranges to transfer information from the high priority queue to some of the operational crossbar devices, e.g., crossbar devices A and B. The process in block 115 arranges to transfer information from the other non-high priority queues to the other remaining operational crossbar devices, e.g., crossbar device C, and then the process ends. In one embodiment, the process in blocks 113 and 115 determines the arrangement of the transfer of information from the high priority and non-high priority queues to the operational crossbar devices based on the following:

When the high priority queue has an occupancy level of medium or low, for each occupancy level (from high to low) of the non-high priority queues the process allocates one less crossbar devices. For example, if the occupancy level is high for the non-high priority queues, the process allocates four crossbar devices, for a medium occupancy level, three crossbar devices, and for a low occupancy level, two crossbar devices. The occupancy level of the high priority queue determines the starting point or total number of crossbar devices that the process allocates to the non-high priority queues. Using the above example, if the occupancy level of the high priority queue is low, the total number of crossbar devices is four and for a medium occupancy level, the total number of crossbar devices is three. If the total number of operational crossbar devices is four, then in the above example, the information in the high priority queue is not transferred to a crossbar device until the occupancy level of the non-high priority queues reduces from high to medium.

In one embodiment, redundancy is employed by utilizing an additional spare or a complete set of spare links or crossbar devices (e.g., for each available link or crossbar device another link or crossbar device acting as a backup is provided) dedicated to handle the transfer of information if a link or crossbar device fails. As such, the switch-over from one link or crossbar device that failed to the additional (redundant) link or crossbar device is performed quickly to cause minimal or no down-time by the switch. In another embodiment, redundancy is employed utilizing all the available links or crossbar devices that are operational. If a link or crossbar device fails, information transfer continues using the number of available links or crossbar devices, however, the number of available links or crossbar devices is now reduced by one, i.e., minus the failed link or device. Thus, the transfer of information is maintained and thereby causing minimal or no down-time to the switch.

Similarly, in one embodiment, scaleability is employed by again utilizing all the available links or crossbar devices that are operational. If a link or crossbar device is added, information transfer continues using the number of available links or crossbar devices, however, the number of available links or crossbar devices is now increased by one or more, i.e., adding the new links or devices. Hence, transfer of information is maintained and thus causing minimal or no down-time to the switch.

Figure 5:
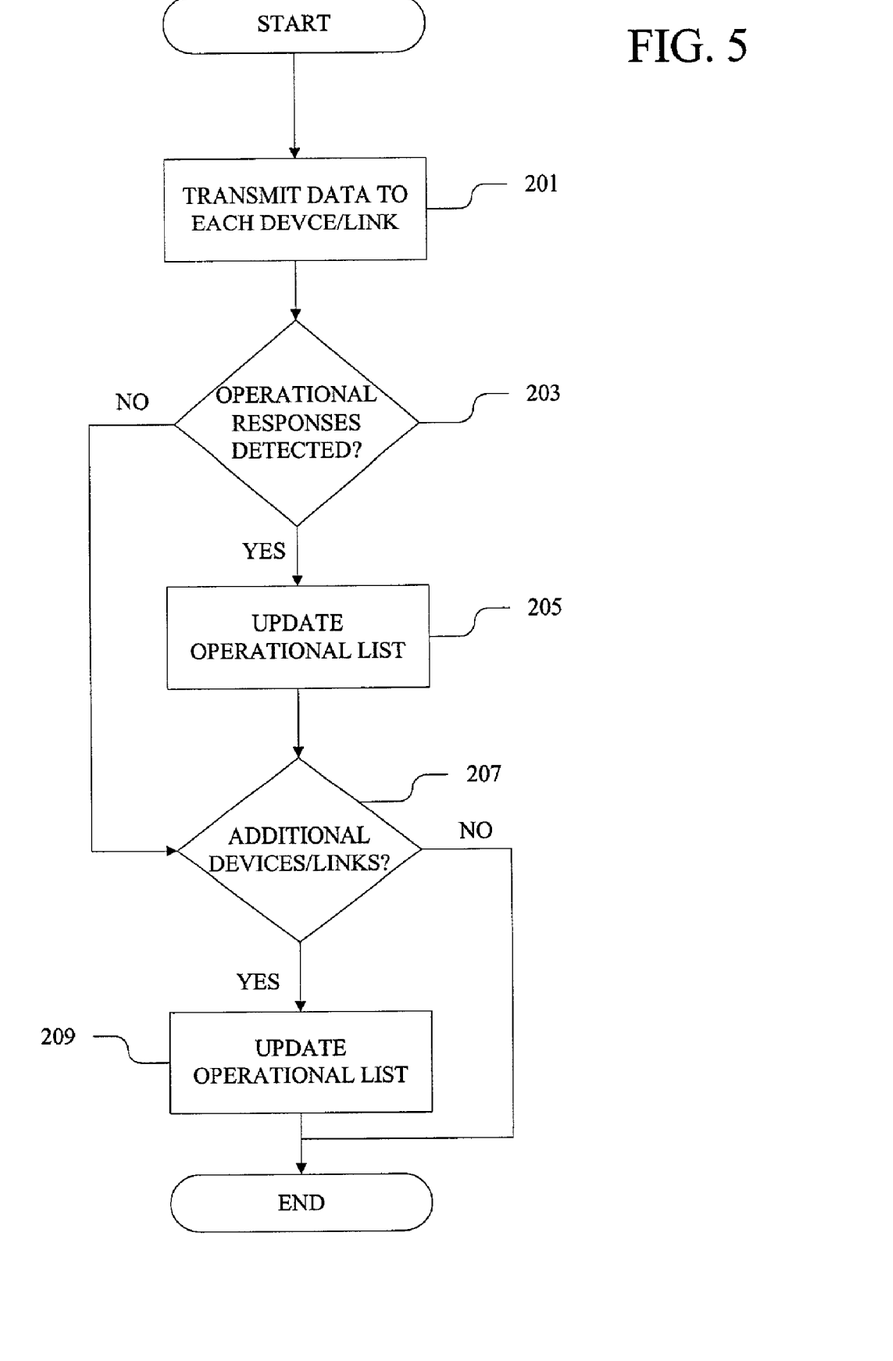
FIG. 5 illustrates one embodiment of the determination of the operating conditions process of the present invention.

FIG. 5 illustrates an embodiment of the process of determining the operating conditions of the available crossbar devices or links. In block 201, the process transmits predetermined data, frames or packets, to each crossbar device or link. In one embodiment, the predetermined data comprise a status command, framing packets and/or information to be transmitted on the device or link. In one embodiment, the load balancer sends the data to the devices or links. In block 203, the process detects any operational responses from the crossbar devices or links in response to the predetermined data. In one embodiment, the process waits for a predetermined response such as an out of frame error, a status response or an error message, to indicate that a particular device or link or a set of devices or links are not operating or available to receive information. In another embodiment, the process waits for a specific period of time and if no response is received the process determines that an operational response has occurred.

If, in block 203, the process detects an operational response, the process updates an operational list of crossbar devices in block 205. In one embodiment, the operational list comprises a list of available crossbar devices or available links and the process updates the operational list by removing the crossbar device or link from the list when an operational response, e.g., an out of frame condition, is detected in block 203. The operational list, in one embodiment, is utilized by the load balancer or process both previously described to determine the operational conditions of the devices or links for the transmission of information. In one embodiment, the process updates the list by disabling a device or link when a non-operational link or device is detected by, for example, marking or otherwise indicating in the list that the device is not operational. Also, in one embodiment, the mark or indication is recognized by the load balancer or the process to determine the operational conditions of the devices or links. If the process does not detect an operational response, the process continues to block 207.

In block 207, the process determines if additional devices or links are available. In one embodiment, the process determines if additional devices or links are available by transmitting predetermined data to a location where an additional device or link might be. In various embodiments, the location where an additional device or link is expected to be is a predefined offset from the last operational crossbar device or link detected, a specific address location or shared memory space where all the devices and links are provided a specific address/memory space or location, or an additional entry in the operational list. If, in block 207, the process does not detect an operational response in response to the transmitted data, the process updates the operational list in block 209. The process then ends. In one embodiment, the process adds the additional link or device located to the operational list. If, in block 207, the process does detect an operational condition indicating that a new or additional device or link is not operating, e.g., provides an out of frame error, then the process ends.

In one embodiment, operations performed by the process in blocks 207–209 are combined with blocks 201–205. For instance, the process in block 201 transmits predetermined data to each device or link and additionally to a location where an additional device or link might be. In block 203, the process detects an operational response, e.g., an out of frame condition, in response to the transmitted data from each of the devices or links and any possible additional new devices or links. In block 205, the process updates the operational list, e.g., removing or disabling devices or links from the list that are not operational, e.g., having an out of frame condition, and/or adding devices or links to the list that are new and operational. In one embodiment, the process continually repeats at predetermined intervals, such as once a day or once a week, or at specific predetermined times, such as at initialization or a scheduled maintenance. In another embodiment, the process does not send or transmit predetermined packets, but waits to be interrupted or polls for a response from the devices or links as to the operational condition of each device or link.

In one embodiment, the operational response indicates that a particular device or link or a set of devices or links are operational or available to receive information. Thus, in this embodiment, in blocks 205 and 209, if the process detects an operational condition, the process, in one embodiment, updates the operational list by adding the device or link that provided the response or the device or link indicated as being operational by the response. Likewise, if the process does not detect an operational condition, the process removes or disables the device or link in the operational list. Also, in one embodiment, the process in block 205 may be configured to detect an operational condition that indicates that a particular device or link or set of devices or links are operational or available to receive information and in block 209, the process may be configured to detect an operational condition that indicates that a particular device or link or set of devices or links are not operational or not available to receive information or vice versa.

Accordingly, the present invention provides an automatic load balancer. Although the invention has been described in certain specific embodiments, it should be recognized that those of skill in the art would recognize other insubstantially different ways to implement the present invention. Thus, the present embodiments should be considered exemplary only, with the invention defined by the claims and their equivalents supported by this disclosure.

What is claimed is:

1. A load balancing system for network nodes, the load balancing system comprising:
    a plurality of crossbar devices;
    a plurality of queues configured to receive data; and
    a load balancer coupled to the plurality of queues and configured to determine an amount of data in each of the plurality of queues and to send the data to specific ones of the plurality of crossbar devices based on the amount of data in each queue;
    wherein the system is configured to place each data of the plurality of data in a specific queue of the plurality of queues based on a priority associated with each data; and
    wherein the load balancer is configured to detect availability of additional crossbar devices.

2. The load balancing system of claim 1 wherein the plurality of queues comprises a high priority queue and a plurality of non-high priority queues.

3. The load balancing system of claim 2 wherein the load balancer is configured to send data to specific crossbar devices of the plurality of crossbar devices based on an amount of data in the high priority queue relative to an amount of data in each of the plurality of non-high priority queues.

4. The load balancing system of claim 2 wherein the load balancer is configured to send data to specific crossbar devices in a order that is based on one of the amount of data in the high priority queue and an amount of data in each of the plurality of non-high priority queues.

5. The load balancing system of claim 2 wherein the load balancer is configured to send data to specific crossbar devices of the plurality of crossbar devices based on an amount of data in each of the plurality of non-high priority queues relative to an amount of data in the high priority queue.

6. The load balancing system of claim 2 wherein the load balancer is configured to send data to specific crossbar devices in a order based on one of an amount of data in the high priority queue and an amount of data in each of the plurality of non-high priority queues.

7. The load balancing system of claim 1 further comprising a capacity indicator identifying the amount of data in each queue.

8. The load balancing system of claim 7 wherein the load balancer is configured to determine the amount data in each queue based on examining the capacity indicator and to transmit data to the plurality of crossbar devices in a predetermined order based on the examination of the capacity indicator.

9. The load balancing system of claim 7 wherein the capacity indicator further indicates an occupancy level based on the amount of data in each queue.

10. The load balancing system of claim 9 wherein load balancer is configured to transmit data to the plurality of crossbar devices in a predetermined order based on various occupancy levels of each queue as indicated by the capacity indicator.

11. The load balancing system of claim 10 wherein the occupancy levels are high, medium, low and empty.

12. The load balancing system of claim 1 wherein each of the queues are divided into a plurality of portions having a corresponding portion indicator for each portion of the queues to identify that data are in a corresponding portion of a queue.

13. The load balancing system of claim 12 wherein the portion indicators are modifiable to indicate various occupancy levels in the queue.

14. The load balancing system of claim 12 wherein the load balancer is configured to transmit data from the plurality of queues to the plurality of crossbar devices in a predetermined order based on the portion indicators.

15. The load balancing system of claim 2 wherein each of the queues are divided into a first portion, a second portion and a third portion.

16. The load balancing system of claim 15 wherein the data received are placed first in the first portion, when the first portion is full, the received data are placed in the second portion and, when the second portion is full, the received data are placed the third portion of the queue.

17. The load balancing system of claim 15 wherein the load balancer is configured to determine that data are in the third portion of the queue of the high priority queue and to cause the data in the high priority queue to be transmitted to all the plurality of crossbar devices that are available when data are in the third portion of the queue of the high priority queue.

18. The load balancing system of claim 15 wherein the load balancer is configured to determine that data are only in the first portion of the queue of the high priority queue and to cause the data in the third portion of the non-high priority queues to be transmitted to all the plurality of crossbar devices that are available when data are only in the first portion of the queue of the high priority queue.

19. The load balancing system of claim 15 wherein the load balancer is configured to determine that data are only in the non-high priority queues and to cause the data in the non-high priority queues to be transmitted to all the plurality of crossbar devices that are available when data are only in the non-high priority queues.

20. The load balancing system of claim 15 wherein the load balancer is configured to determine that data are only in the high priority queues and to cause the data in the high priority queues to be transmitted to all the plurality of crossbar devices that are available when data are only in the high priority queues.

21. The load balancing system of claim 15 wherein the load balancer is configured to determine that data are in one of the first and second portions of the queue of the high priority queue and to cause the data in the non-high priority queues to be transmitted to particular predetermined crossbar devices that are available and to cause the data in the high priority queue to be transmitted to remaining crossbar devices from the plurality of crossbar devices that are available.

22. The load balancing system of claim 15 further comprising:
   a first indicator identifying that data are in the first portion of a queue;
   a second indicator identifying that data are in the second portion of a queue; and
   a third indicator identifies that data are in the third portion of a queue.

23. The load balancing system of claim 22 wherein the load balancer is configured to determine that the third indicator identifies that data are in the third portion of the queue of the high priority queue and to cause the data in the non-high priority queues to be transmitted to all the plurality of crossbar devices that are available.

24. The load balancing system of claim 1 wherein the load balancer is configured to detect inoperable crossbar devices.

25. The load balancing system of claim 24 wherein the load balancer is configured to detect inoperable devices by being configured to send a message to the plurality of crossbar devices and to receive a response sent from each of the plurality of crossbar devices that are operating.

26. The load balancing system of claim 24 wherein the load balancer is configured to detect inoperable devices by being configured to send a message to the plurality of crossbar devices and to determine if a response sent from each of the plurality of crossbar devices that are operating is within a predetermined time.

27. The load balancing system of claim 24 wherein the load balancer is configured to detect availability of additional crossbar devices by being configured to attempt to transmit data to the additional crossbar devices.

28. The load balancing system of claim 27 wherein the load balancer is configured to send data to at least one predetermined location and to receive a response sent from each of the additional crossbar devices that are added.

29. The load balancing system of claim 28 wherein the predetermined location is an offset in a shared memory.

30. The load balancing system of claim 27 wherein the load balancer is configured to receive data sent from each of the additional crossbar devices and to update an operational list of available crossbar devices.

31. The load balancing system of claim 1 further comprising a processor coupled to the load balancer.

32. A load balancing method comprising:
receiving a plurality of data;
storing the plurality of data in a plurality of queues;
determining occupancy levels in each of the plurality of queues;
transmitting the data to a plurality of crossbar devices based on the determined occupancy levels in each queue; and
determining the availability of additional crossbar devices;
wherein each data of the plurality of data is placed in a specific queue of the plurality of queues based on a priority associated with each data.

33. The load balancing method of claim 32 wherein the plurality of queues comprises a high priority queue and a plurality of non-high priority queues.

34. The load balancing method of claim 33 further comprising:
dividing each of the queues into a first portion, a second portion and a third portion; and
determining if data are in the first, second and third portions of the plurality of queues.

35. The load balancing method of claim 34 wherein transmitting the data further comprises transmitting the data in the high priority queue to all the plurality of crossbar devices, upon determining that data are in the third portion of the queue of the high priority queue.

36. The load balancing method of claim 34 wherein transmitting the data further comprises transmitting the data in the third portion of the non-high priority queues to all the plurality of crossbar devices, upon determining that data are in the first portion of the queue of the high priority queue.

37. The load balancing method of claim 34 wherein transmitting the data further comprises transmitting the data in the non-high priority queues to all the plurality of crossbar devices, upon determining that data are only in the non-high priority queues.

38. The load balancing method of claim 34 wherein transmitting the data further comprises transmitting the data in the high priority queues to all the plurality of crossbar devices, upon determining that data are only in the high priority queues.

39. The load balancing method of claim 34 wherein transmitting the data further comprises transmitting the data in the non-high priority queues to particular predetermined crossbar devices and transmitting the data in the high priority queue to remaining crossbar devices from the plurality of crossbar devices, upon determining that data are in one of the first and second portions of the queue of the high priority queue.

40. The load balancing method of claim 33 wherein the occupancy levels in each queue are based on an amount of data in the high priority queue and an amount of data in each of the plurality of non-high priority queues.

41. The load balancing method of claim 33 wherein the data are transmitted to specific crossbar devices in an order that is based on an occupancy level of the high priority queue and an occupancy level in each of the plurality of non-high priority queues.

42. The load balancing method of claim 32 further comprising dividing the queues into a plurality of portions having a corresponding portion indicator for each portion of the queues to identify that data are in a corresponding portion of a queue.

43. The load balancing method of claim 42 further comprising modifying the portion indicators to indicate various occupancy levels in the queue.

44. The load balancing method of claim 42 wherein the data are transmitted to specific crossbar devices in an order based on the portion indicators.

45. The load balancing method of claim 32 further comprising detecting an inoperable crossbar devices and ceasing transmitting data to the inoperable crossbar devices.

46. The load balancing method of claim 32 further comprising detecting an operational condition of each of the plurality of crossbar devices and transmitting data to the crossbar devices based on the operational condition.

47. The load balancing method of claim 32 further comprising detecting availability of additional crossbar devices by attempting to transmit data to the additional crossbar devices.

* * * * *